(12) United States Patent
Koog et al.

(10) Patent No.: US 9,094,011 B2
(45) Date of Patent: Jul. 28, 2015

(54) POWER GATE SWITCH ARCHITECTURE

(71) Applicant: Samsung Electronics Co., Ltd., Suwon-si, Gyeonggi-do (KR)

(72) Inventors: Young Koog, Milpitas, CA (US); Revathi Govindarajan, Milpitas, CA (US); Anil Kumar Gundurao, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/267,862

(22) Filed: May 1, 2014

(65) Prior Publication Data

US 2015/0145555 A1 May 28, 2015

Related U.S. Application Data (60) Provisional application No. 61/910,029, filed on Nov. 27, 2013.

(51) Int. Cl.
| | |
|---|---|
| *H03K 19/177* | (2006.01) |
| *H03K 17/16* | (2006.01) |
| *H03K 19/00* | (2006.01) |
| *H03K 19/003* | (2006.01) |
| *G06F 17/50* | (2006.01) |

(52) U.S. Cl.
CPC .......... *H03K 17/161* (2013.01); *G06F 17/5072* (2013.01); *H03K 19/0013* (2013.01); *H03K 19/00315* (2013.01); *H03K 19/177* (2013.01); *G06F 2217/02* (2013.01); *G06F 2217/08* (2013.01); *G06F 2217/78* (2013.01); *G06F 2217/82* (2013.01)

(58) Field of Classification Search
CPC .............. H03K 19/0016; H03K 19/01; H03K 19/0013; H01L 23/5286; H01L 27/0207; H01L 27/11807; G06F 17/5068; G06F 2217/78; G06F 17/5031; G06F 17/5077; G11C 2207/2227
USPC .................. 326/81, 33, 35; 327/544, 377; 716/119–120, 122, 127, 133
See application file for complete search history.

(56) References Cited

U.S. PATENT DOCUMENTS

| | | | |
|---|---|---|---|
| 6,329,874 B1 * | 12/2001 | Ye et al. ......................... | 327/544 |
| 7,051,308 B2 | 5/2006 | McManus et al. | |
| 7,088,141 B2 * | 8/2006 | Deogun et al. .................. | 326/82 |
| 7,248,090 B2 * | 7/2007 | Ramprasad .................... | 327/202 |
| 7,436,205 B2 * | 10/2008 | Tada .............................. | 326/33 |
| 7,509,613 B2 | 3/2009 | Frenkil | |
| 7,774,728 B2 * | 8/2010 | Frenkil ......................... | 716/103 |
| 7,911,231 B2 * | 3/2011 | Yamashita ..................... | 326/62 |
| 7,987,441 B2 | 7/2011 | Frenkil et al. | |
| 8,499,272 B2 * | 7/2013 | Ishii .............................. | 716/127 |

(Continued)

*Primary Examiner* — Vibol Tan
(74) *Attorney, Agent, or Firm* — Renaissance IP Law Group LLP (57) ABSTRACT

Inventive aspects include a method, apparatus, and system for reducing power switch cells in MTCMOS circuits. Such may include disposing columns of real and virtual power straps orthogonally over rows of logic cells. A first power switch cell can be disposed over a real and a virtual power strap in a first column, and collinear with a first row of logic cells. A second power switch cell can be disposed over a real a virtual power strap in a second column, and collinear with a fifth row of logic cells. A third power switch cell can be disposed over a real a virtual power strap in a third column, and collinear with a third row of logic cells. A fourth power switch cell can be disposed over a real a virtual power strap in a fourth column, and collinear with a seventh row of logic cells.

16 Claims, 9 Drawing Sheets

(56) References Cited

U.S. PATENT DOCUMENTS

| | | | |
|---|---|---|---|
| 8,504,967 B2 * | 8/2013 | Suzuki et al. | 716/120 |
| 8,519,775 B2 * | 8/2013 | Idgunji et al. | 327/534 |
| 8,561,004 B2 * | 10/2013 | Kosonocky | 716/133 |
| 8,726,216 B2 * | 5/2014 | Suzuki et al. | 716/122 |

\* cited by examiner

| BLOCK 1 | CONVENTIONAL APPROACH 705 | USING EMBODIMENTS OF INVENTIVE CONCEPT 710 |
|---|---|---|
| IR DROP ON VDD NET | 11.9 mV | 12.5 mV |
| IR DROP ON VSS NET | 4.0 mV | 4.1 mV |
| GRID RESISTANCE | 227.663 Ohms | 226 Ohms |
| DYNAMIC IR DROP | 77.4 mV | 70.67 mV |
| NUMBER OF SWITCH CELLS | 6099 | 5152 |

FIG. 7

| BLOCK 2 | CONVENTIONAL APPROACH 805 | USING EMBODIMENTS OF INVENTIVE CONCEPT 810 |
|---|---|---|
| IR DROP ON VDD NET | 11.5 mV | 12.5 mV |
| IR DROP ON VSS NET | 1.2 mV | 1.3 mV |
| GRID RESISTANCE | 265 Ohms | 266 Ohms |
| DYNAMIC IR DROP | 51.3 mV | 52.1 mV |
| NUMBER OF SWITCH CELLS | 19609 | 17132 |

FIG. 10

POWER GATE SWITCH ARCHITECTURE

BACKGROUND

The present inventive concepts relate to semiconductor circuits, and more particularly, to methods for designing and manufacturing such circuits, and to the physical architecture of the circuits resulting from using such methods.

A significant concern in integrated circuit design is reducing leakage currents. Leakage currents flow in logic circuits from a power supply node into the ground node because the switching characteristics of the transistors in the logic circuits are not ideal (i.e., the transistors cannot be completely shut off). In multi-threshold complementary metal-oxide semiconductor (MTCMOS) circuits, one technique that reduces leakage current is to place a "power gate" (sometimes referred to as a "power switch" or "switch cell") between a virtual power supply (i.e., "virtual power") and a primary power reference (i.e., "reference power") supply.

The power gate is typically a transistor which has a higher threshold voltage than the threshold voltage of the transistors used to implement the logic cells. In one mode, a leakage current flows from a real power supply node through a virtual power supply node, then through a logic cell domain, and then to a true ground node. In another mode, the virtual power supply node of the power gate cuts off the leakage current path from the virtual power node to the true ground node. Logic cells can be arranged in rows. Conventionally, the power switches are placed in alternate rows in a single column to avoid latch up issues. In other words, for a given column of power switches, every other row within the column has associated therewith a power switch. This technique results in an abundance of power switches, congestion, and leakage consumed by the power switches. In this configuration, n-wells in power switch cells need to be biased to the real power supply to be functional, and therefore, the power switch cells are placed in staggered or alternating fashion.

What is needed is an improved power gate switch architecture and technique for reducing power switches and layers while satisfying design requirements.

BRIEF SUMMARY

Inventive concepts may include a MTCMOS semiconductor circuit. The circuit may include a plurality of rows of logic cells, a real power strap substantially orthogonally disposed over the plurality of rows of logic cells, a virtual power strap substantially orthogonally disposed over the plurality of rows of logic cells and adjacent to the real power strap, a first power switch cell disposed over a first portion of the real power strap and a first portion of the virtual power strap and collinear with a first row from among the plurality of rows of logic cells, and a second power switch cell disposed over a second portion of the real power strap and a second portion of the virtual power strap and collinear with another row from among the plurality of rows of logic cells. Two or more rows of logic cells from among the plurality of rows of logic cells are between the first row of logic cells and the another row of logic cells. The another row may be referred to as a ninth row of logic cells from among the plurality of rows of logic cells. The two or more rows include a second row, a third row, a fourth row, a fifth row, a sixth row, a seventh row, and an eighth row of logic cells between the first row of logic cells and the ninth row of logic cells, and none of the second row, the third row, the fourth row, the fifth row, the sixth row, the seventh row, and the eighth row include a power switch cell disposed over the real power strap and the virtual power strap.

The real power strap may be referred to as a first real power strap, and the virtual power strap may be referred to as a first virtual power strap. The semiconductor circuit may further include a second real power strap substantially orthogonally disposed over the plurality of rows of logic cells, a second virtual power strap substantially orthogonally disposed over the plurality of rows of logic cells and adjacent to the second real power strap, and a third power switch cell disposed over a portion of the second real power strap and a portion of the second virtual power strap, and collinear with the fifth row from among the plurality of rows of logic cells.

The semiconductor circuit may further include a third real power strap substantially orthogonally disposed over the plurality of rows of logic cells, a third virtual power strap substantially orthogonally disposed over the plurality of rows of logic cells and adjacent to third the real power strap, and a fourth power switch cell disposed over a portion of the third real power strap and a portion of the third virtual power strap, and collinear with the third row from among the plurality of rows of logic cells.

The semiconductor circuit may further include a fourth real power strap substantially orthogonally disposed over the plurality of rows of logic cells, a fourth virtual power strap substantially orthogonally disposed over the plurality of rows of logic cells and adjacent to fourth the real power strap, and a fifth power switch cell disposed over a portion of the fourth real power strap and a portion of the fourth virtual power strap, and collinear with the seventh row from among the plurality of rows of logic cells.

The semiconductor circuit may further include a fifth real power strap substantially orthogonally disposed over the plurality of rows of logic cells, a fifth virtual power strap substantially orthogonally disposed over the plurality of rows of logic cells and adjacent to the fifth real power strap, and a sixth power switch cell disposed over a portion of the fifth real power strap and a portion of the fifth virtual power strap, and collinear with the first row from among the plurality of rows of logic cells.

The first row of logic cells may be adjacent to the second row, the second row of logic cells may be adjacent to the third row, the third row of logic cells may be adjacent to the fourth row, the fourth row of logic cells may be adjacent to the fifth row, the fifth row of logic cells may be adjacent to the sixth row, the sixth row of logic cells may be adjacent to the seventh row, the seventh row of logic cells may be adjacent to the eighth row, and the eighth row of logic cells may be adjacent to the ninth row.

The real power strap may be referred to as a first real power strap, and the virtual power strap may be referred to as a first virtual power strap. The semiconductor circuit may further include a second real power strap substantially orthogonally disposed over the plurality of rows of logic cells, a second virtual power strap substantially orthogonally disposed over the plurality of rows of logic cells and adjacent to second the real power strap, a third power switch cell disposed over a portion of the second real power strap and a portion of the second virtual power strap, and collinear with the fifth row from among the plurality of rows of logic cells, a third real power strap substantially orthogonally disposed over the plurality of rows of logic cells, a third virtual power strap substantially orthogonally disposed over the plurality of rows of logic cells and adjacent to the third real power strap, a fourth power switch cell disposed over a portion of the third real power strap and a portion of the third virtual power strap, and collinear with the third row from among the plurality of rows of logic cells, a fourth real power strap substantially orthogo-nally disposed over the plurality of rows of logic cells, a fourth virtual power strap substantially orthogonally disposed over the plurality of rows of logic cells and adjacent to the fourth real power strap, a fifth power switch cell disposed over a portion of the fourth real power strap and a portion of the fourth virtual power strap, and collinear with the seventh row from among the plurality of rows of logic cells, a fifth real power strap substantially orthogonally disposed over the plurality of rows of logic cells, a fifth virtual power strap substantially orthogonally disposed over the plurality of rows of logic cells and adjacent to the fifth real power strap, and a sixth power switch cell disposed over a portion of the fifth real power strap and a portion of the fifth virtual power strap, and collinear with the first row from among the plurality of rows of logic cells.

The positioning of the first, third, fourth, and fifth power switch cells may form a power switch cell layout pattern. The power switch cell layout pattern can repeat for every eight rows of logic cells from among the plurality of rows of logic cells.

The semiconductor circuit may further include a first group of logic cells and a second group of logic cells. The first group of logic cells can be adjacent to at least four power switch cells from among the power switch cell layout pattern. The second group of logic cells can be adjacent to at least four different power switch cells from among the power switch cell layout pattern. The at least four power switch cells can provide voltage sources to the first group of logic cells. The at least four different power switch cells can provide voltage sources to the second group of logic cells.

The real power strap can be connected to a metal 5 layer. The virtual power strap can be connected to a metal 3 layer. The metal 3 layer is a relatively lower layer than the metal 5 layer.

The semiconductor circuit may further include a plurality of tap cells disposed over portions of the real power strap and portions of the virtual power strap. The plurality of tap cells may include always on tap cells.

Certain of the inventive features may be best achieved by implementing them in a processor such as within ARM processor core. Other types of processors or application specific integrated circuits (ASICs) can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first power switch cell could be termed a second power switch cell, and, similarly, a second power switch cell could be termed a first power switch cell, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the present inventive concept relates to MTCMOS circuits including a design method for disposing power switches in an MTCMOS circuit, and the physical circuit architecture of MTCMOS circuits resulting therefrom. Embodiments of the present inventive concept result in a significant reduction of the number power switches, while satisfying electromigration (EM) design requirements, voltage drop (i.e., "IR drop") design requirements, and tap cell requirements. Embodiments of the present inventive concept also result in a reduction of an orthogonal layer to connect the switches in parallel.

Figure 1:
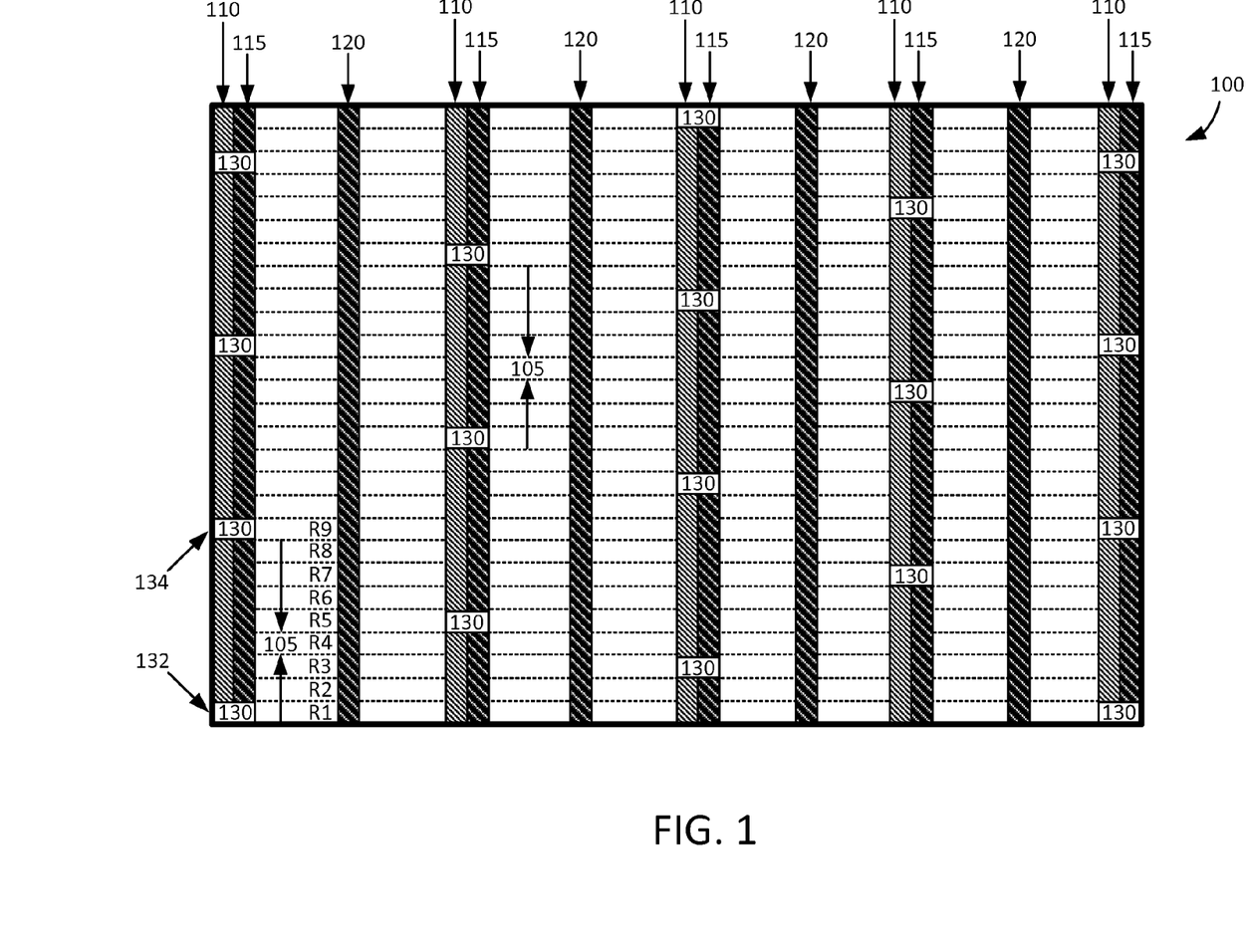
FIG. 1 is an example diagram of a circuit including rows of logic cells, columns of real and virtual power straps, and power switch cells in accordance with embodiments of the inventive concept.

FIG. 1 is an example diagram of a circuit 100, such as an MTCMOS circuit, including rows of logic cells (e.g., 105), columns including real power straps (e.g., 110) and virtual power straps (e.g., 115), and power switch cells (e.g., 130) in accordance with embodiments of the inventive concept. As can be seen in FIG. 1, real power straps 110 can be substantially orthogonally disposed over the rows of logic cells (e.g., 105). In addition, virtual power straps 115 can be substantially orthogonally disposed over the rows of logic cells (e.g., 105). Moreover, true ground power straps 120 can be substantially orthogonally disposed over the rows of logic cells (e.g., 105).

The power switch cells (e.g., 130) can be disposed in a particular pattern. For example, a first power switch cell (e.g., 132) can be disposed over a first portion of the real power strap 110 and a first portion of the virtual power strap 115, and collinear with a first row R1 from among the rows of logic cells (e.g., 105). A second power switch cell (e.g., 134) can be disposed over a second portion of the real power strap 110 and a second portion of the virtual power strap 115, and collinear with another row of logic cells (e.g., R9). Two or more rows of logic cells (e.g., R2 through R8) can be disposed between the rows R1 and R9 of logic cells. In other words, in this embodiment, the power switch cell 132 and the power switch cell 134 are eight (8) rows apart in the same column. Put differently, none of the second row, the third row, the fourth row, the fifth row, the sixth row, the seventh row, and the eighth row include a power switch cell disposed over the real power strap and the virtual power strap, in the same column in which power switch cells 132 and 134 are disposed. The various power switch cells can be arranged in a particular repeating pattern, as further described below.

Figure 2:
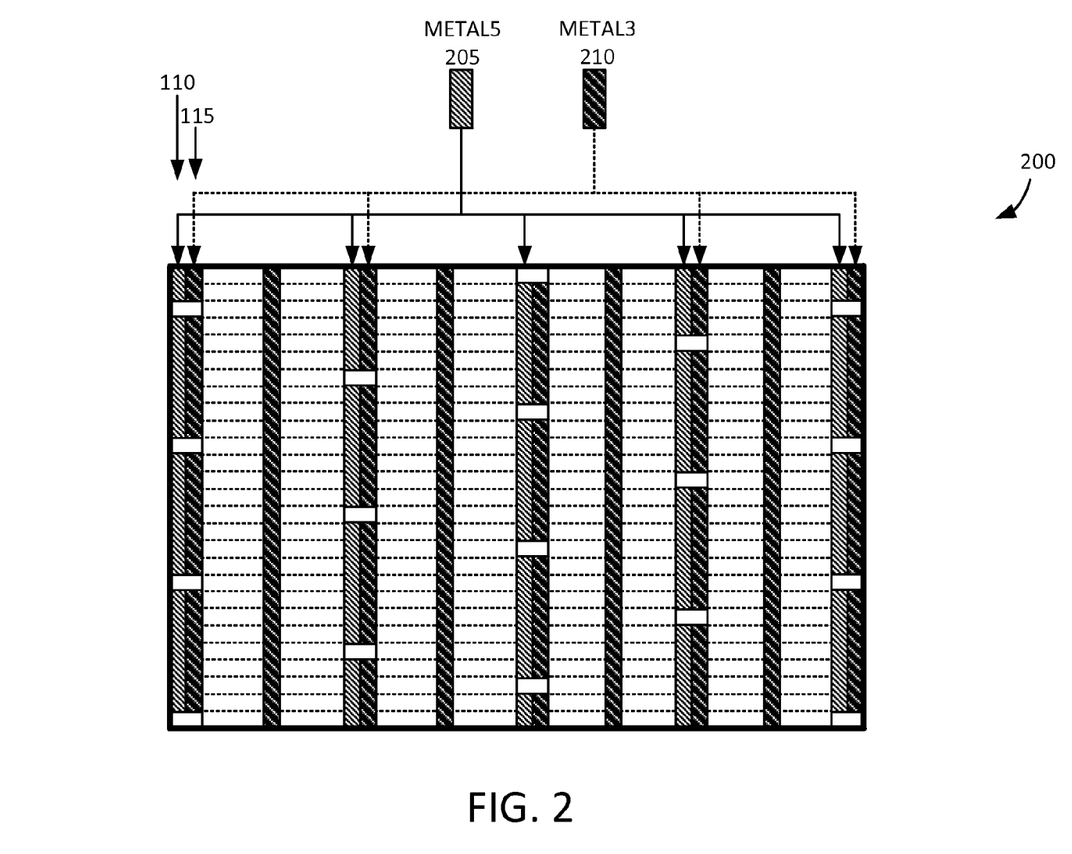
FIG. 2 is an example diagram showing different metal layers in accordance with embodiments of the inventive concept.

FIG. 2 is an example diagram 200 showing different metal layers in accordance with embodiments of the inventive concept. In some embodiments, the real power straps (e.g., 110) are associated with or otherwise connected to a metal 5 layer as shown at 205. In some embodiments, the virtual power straps (e.g., 115) are associated with or otherwise connected to a metal 3 layer. The metal 3 layer can be disposed at a relatively lower layer than the metal 5 layer within the circuit.

Figure 3:
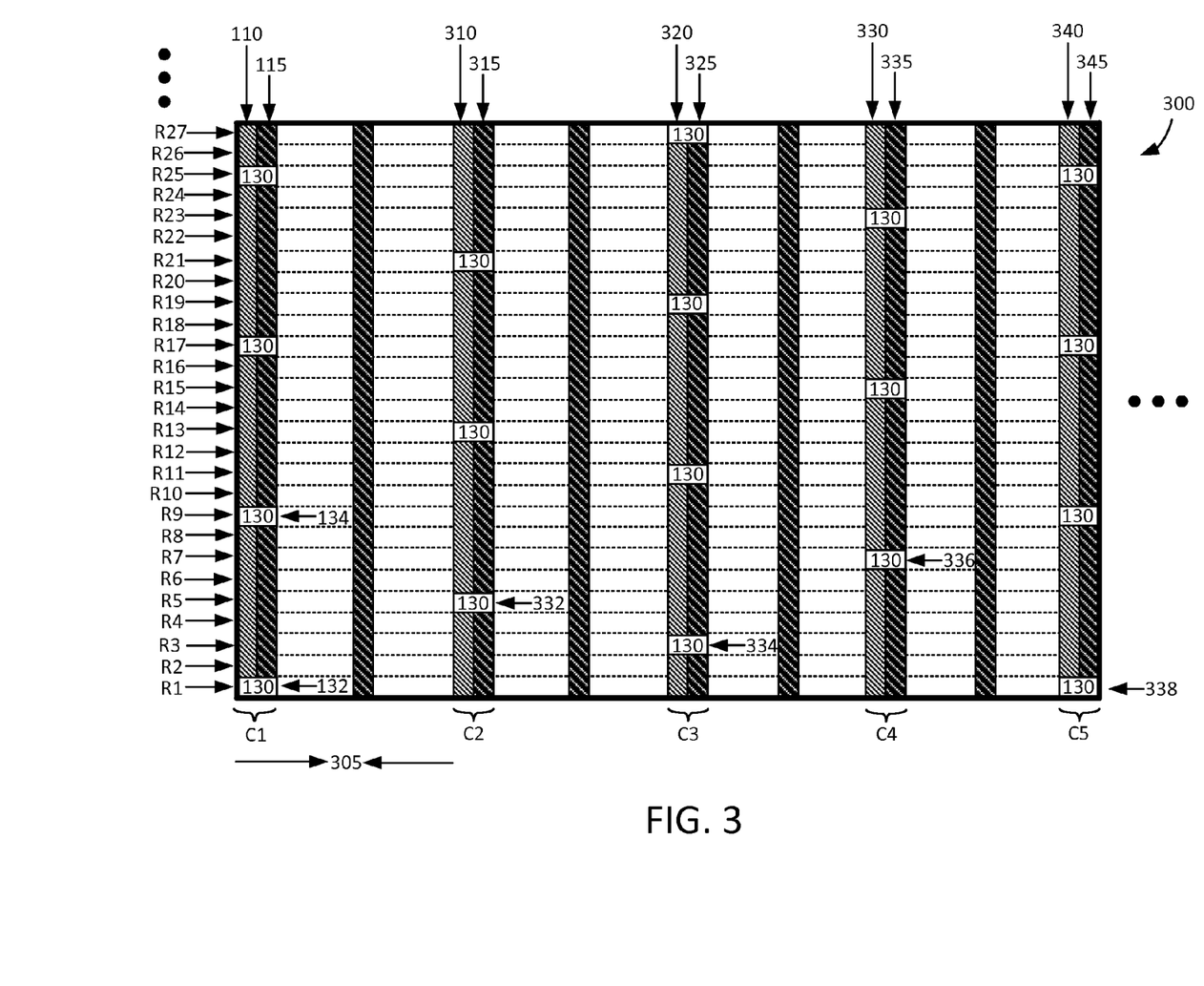
FIG. 3 is yet another example diagram of a circuit including rows of logic cells including rows R1 through 27, columns of real and virtual power straps including columns C1 through C5, and power switch cells in accordance with embodiments of the inventive concept.

FIG. 3 is yet another example diagram of a circuit 300, such as an MTCMOS circuit, including rows of logic cells including rows R1 through R27, columns of real and virtual power straps including columns C1 through C5, and power switch cells (e.g., 130) in accordance with embodiments of the inventive concept. In some embodiments, a distance 305 from the beginning of one column (e.g., C1) to the beginning of another column (e.g., C2) can be 12.8 micrometers (μm) or thereabout. It will be understood that the patterns of power switch cells, rows of logic cells, associated columns, and the like, can be extended, as indicated by the ellipses.

In some embodiments, a second real power strap 310 is substantially orthogonally disposed over the rows of logic cells (e.g., R1 through R27) in column C2. In column C2, a second virtual power strap (e.g., 315) can be substantially orthogonally disposed over the rows of logic cells and adjacent to the second real power strap 310. A third power switch cell 332 can be disposed over a portion of the second real power strap 310 and a portion of the second virtual power strap 315, and collinear with the fifth row R5 from among the rows of logic cells.

In some embodiments, a third real power strap 320 is substantially orthogonally disposed over the rows of logic cells (e.g., R1 through R27) in column C3. In column C3, a third virtual power strap 325 can be substantially orthogonally disposed over the rows of logic cells and adjacent to the third real power strap 320. A fourth power switch cell 334 can be disposed over a portion of the third real power strap 320 and a portion of the third virtual power strap 325, and collinear with the third row R3 from among the rows of logic cells.

In some embodiments, a fourth real power strap 330 is substantially orthogonally disposed over the rows of logic cells (e.g., R1 through R27) in column C4. In column C4, a fourth virtual power strap 335 can be substantially orthogonally disposed over the rows of logic cells and adjacent to fourth the real power strap 330. A fifth power switch cell 336 can be disposed over a portion of the fourth real power strap 330 and a portion of the fourth virtual power strap 335, and collinear with the seventh row R7 from among the rows of logic cells.

In some embodiments, a fifth real power strap 340 is substantially orthogonally disposed over the rows of logic cells (e.g., R1 through R27) in column C5. In column C5, a fifth virtual power strap 345 can be substantially orthogonally disposed over the rows of logic cells and adjacent to fifth the real power strap 330. A sixth power switch cell 338 can be disposed over a portion of the fifth real power strap 340 and a portion of the fifth virtual power strap 345, and collinear with the first row R1 from among the rows of logic cells.

As can be seen in FIG. 3, the first row of logic cells R1 is adjacent to the second row R2, the second row of logic cells R2 is adjacent to the third row R3, the third row of logic cells R3 is adjacent to the fourth row R4, the fourth row of logic cells R4 is adjacent to the fifth row R5, the fifth row of logic cells R5 is adjacent to the sixth row R6, the sixth row of logic cells R6 is adjacent to the seventh row R7, the seventh row of logic cells R7 is adjacent to the eighth row R8, the eighth row of logic cells R8 is adjacent to the ninth row R9, and so forth.

The positioning of the power switch cells 132, 332, 334, and 336 forms a power switch cell layout pattern. The power switch cell layout pattern can repeat for every eight rows of logic cells from among the rows of logic cells. For example, the power switch cell layout pattern can repeat starting with power switch cell 134 associated with the ninth row R9. By way of another example, the end of the pattern at power switch cell 336 in column C4 can be followed by a repeat of the pattern beginning with power switch cell 338 in column C5. In other words, column C4 can mark the end of the power switch cell layout pattern for a particular pattern, and the column C5 can mark the beginning of a repeated power switch cell layout pattern, as further described below with reference to FIG. 4.

Figure 4:
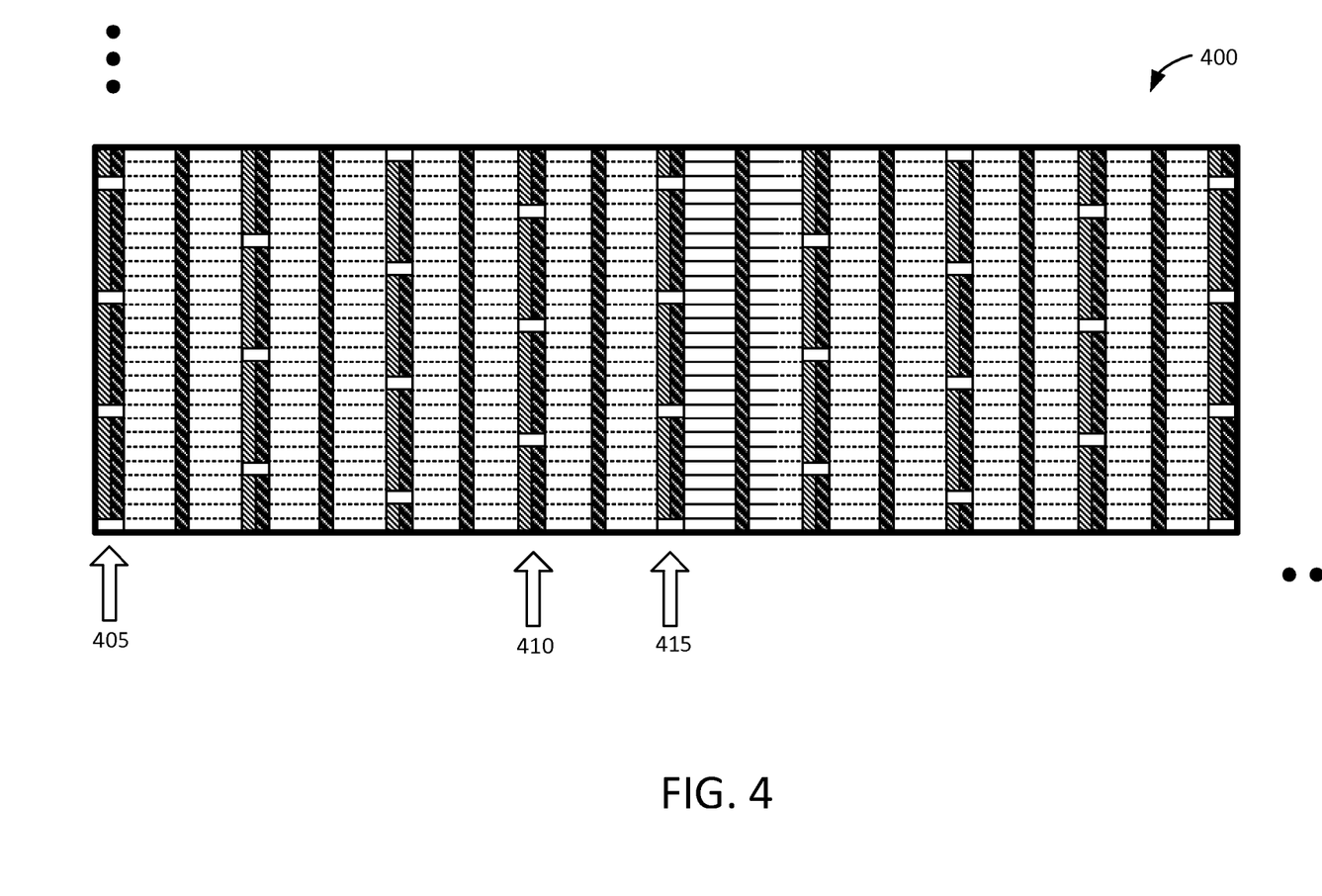
FIG. 4 is still another example diagram of a circuit including a repeated layout pattern of power switch cells in accordance with embodiments of the inventive concept.

FIG. 4 is still another example diagram of a circuit 400 including a repeated layout pattern of power switch cells in accordance with embodiments of the inventive concept. As can be seen in FIG. 4, the power switch cell layout pattern (e.g., power switch cells 132, 332, 334, and 336) can begin at 405 and end at 410, and then repeat beginning at 415. Moreover, the power switch cell layout pattern can repeat throughout the various rows of logic cells, with each repeated layout pattern beginning eight (8) rows from the previous pattern. It will be understood that the power switch cell layout pattern may repeat at other suitable intervals, besides eight rows, and still fall within the inventive principals described and illustrated herein.

Figure 5:
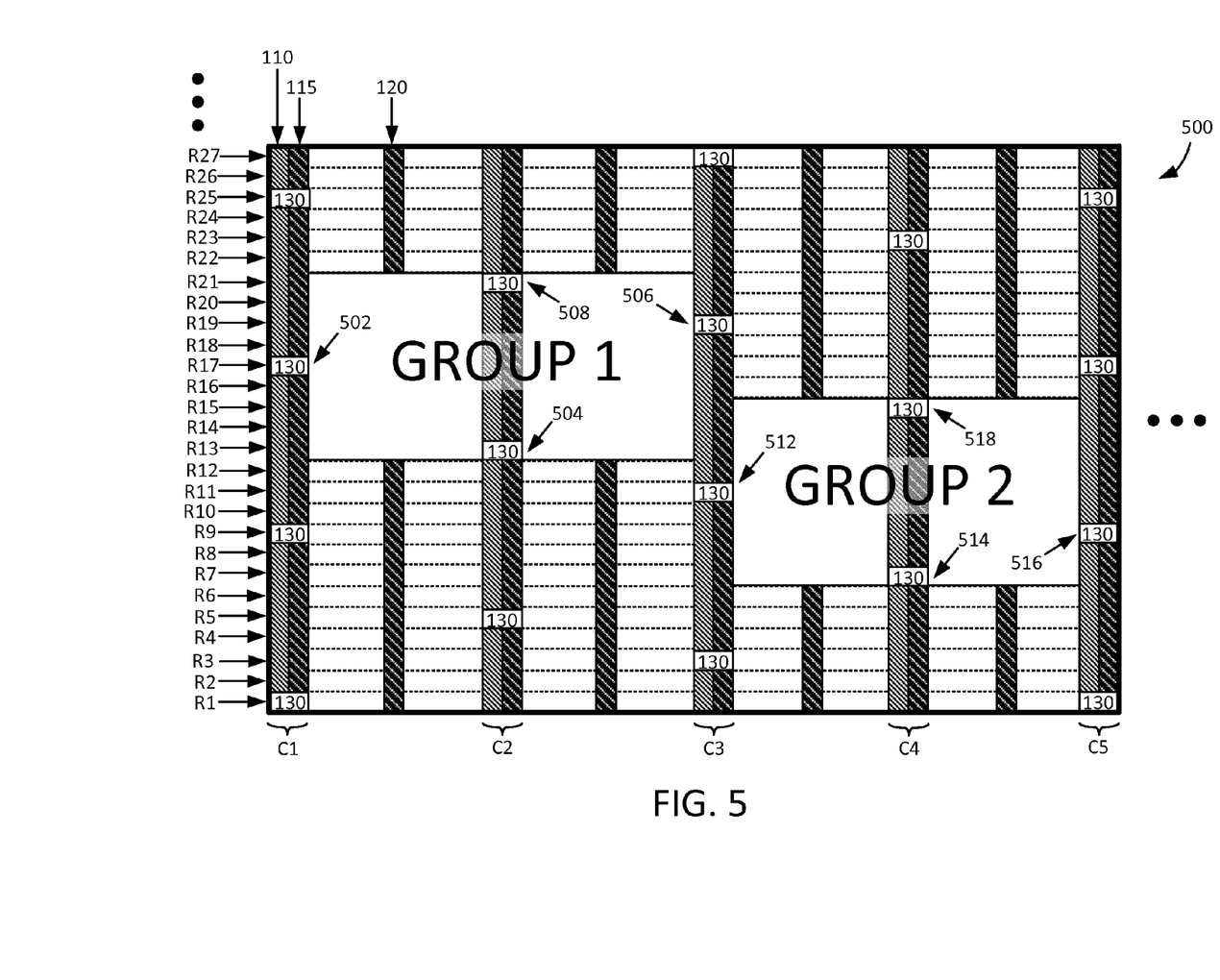
FIG. 5 is an example diagram of a circuit including groups of logic cells that are adjacent to certain power switch cells in accordance with embodiments of the inventive concept.

FIG. 5 is an example diagram of a circuit 500, such as an MTCMOS circuit, including groups of logic cells (e.g., Group 1 and Group 2) that are adjacent to certain power switch cells (e.g., 130) in accordance with embodiments of the inventive concept. The first group of logic cells Group 1 can be adjacent to at least four power switch cells (e.g., 502, 504, 506, and 508) from among the power switch cell layout pattern. Similarly, the second group of logic cells Group 2 can be adjacent to at least four different power switch cells (e.g., 512, 514, 516, and 518) from among the power switch cell layout pattern. The power switch cells 502, 504, 506, and 508 can provide voltage sources to the first group of logic cells Group 1. The different power switch cells 512, 514, 516, and 518 can provide voltage sources to the second group of logic cells Group 2.

Figure 6:
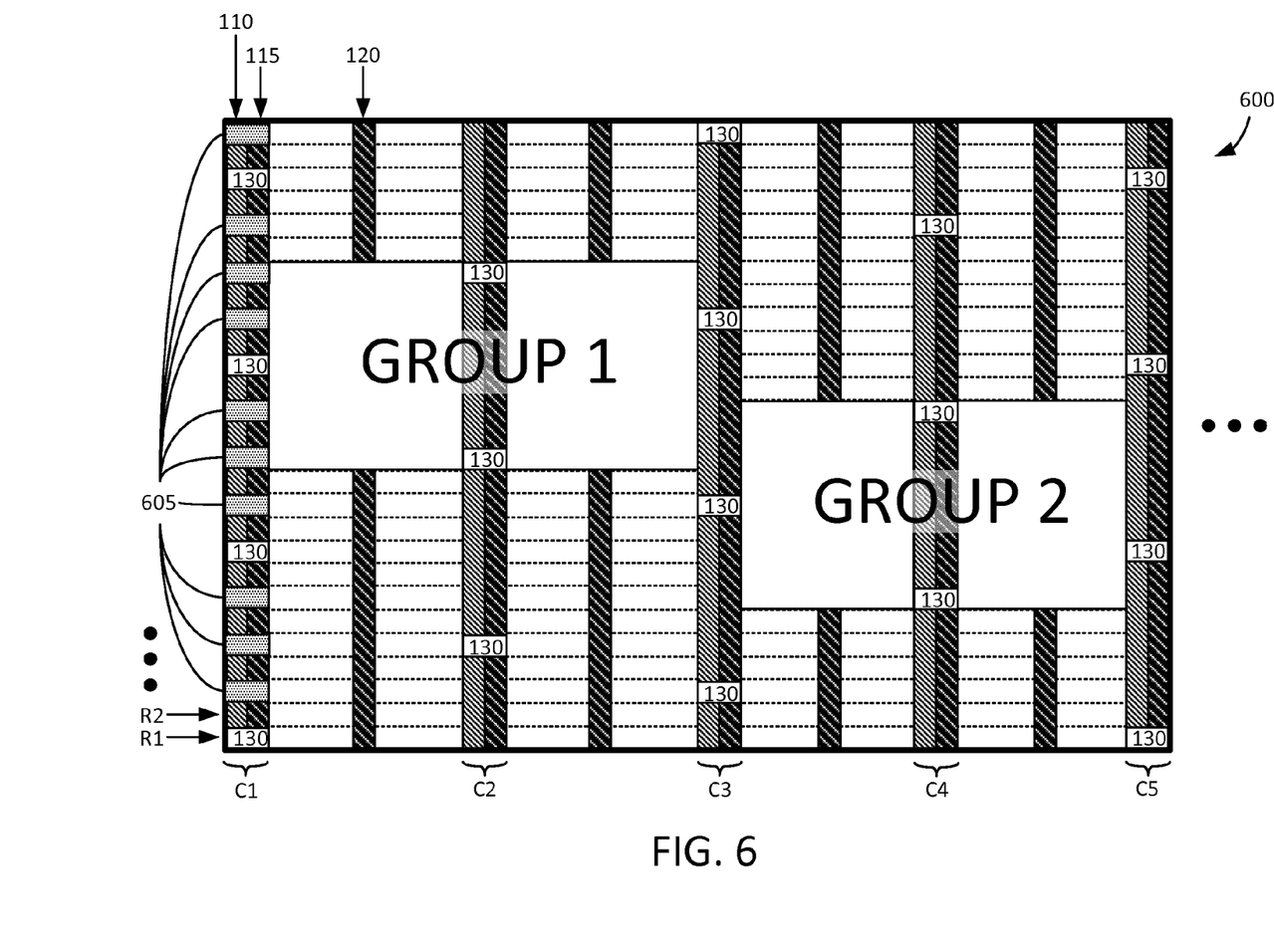
FIG. 6 is an example diagram of a circuit including always on tap cells in accordance with embodiments of the inventive concept.

FIG. 6 is an example diagram of a circuit 600 including always on tap cells (e.g., 605) in accordance with embodiments of the inventive concept. The always on tap cells 605 can be disposed over portions of the real power strap 110 and portions of the virtual power strap 115, for example. It will be understood that the always on tap cells 605 can be associated with and/or disposed over other columns of real and virtual power straps within the circuit 600.

Figure 7:
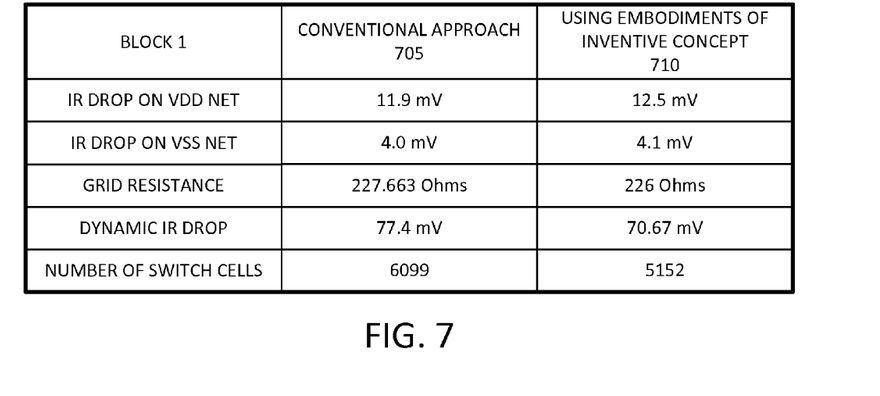
FIG. 7 is a chart showing characteristics of a first block in accordance with embodiments of the inventive concept relative to a conventional approach.

FIG. 7 is a chart showing characteristics of a first block in accordance with embodiments of the inventive concept relative to a conventional approach. As can be seen in the chart, various measurements are listed for the conventional approach 705 as compared to using embodiments of the inventive concept 710 disclosed herein. Of particular note, the number of power switch cells required in the conventional approach 705 is 6099, whereas, the number of power switch cells using embodiments of the inventive concept 710 is 5152. In other words, using embodiments of the present inventive concept, 947 fewer power switch cells can be used within a given block of the MTCMOS circuit. The remaining measurements also show that design requirements are satisfied.

Figure 8:
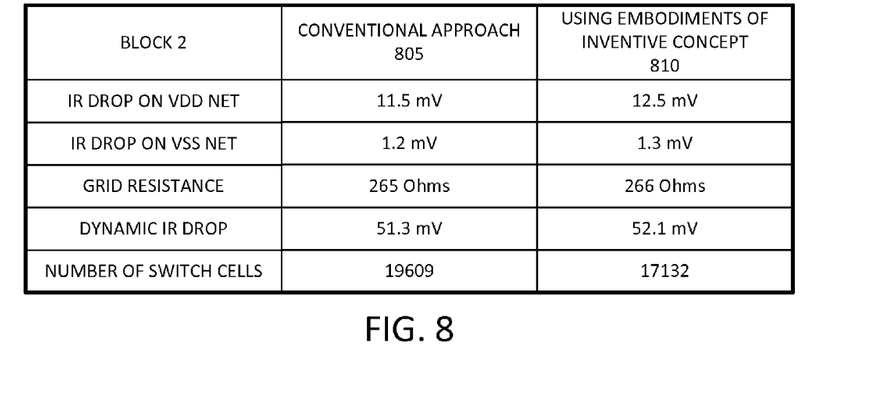
FIG. 8 is another chart showing characteristics of a second block in accordance with embodiments of the inventive concept relative to a conventional approach.

FIG. 8 is another chart showing characteristics of a second block in accordance with embodiments of the inventive concept relative to a conventional approach. In this example, Block 2 of the MTCMOS circuit uses 2477 fewer power switch cells when using embodiments of the present inventive concept 810 as compared to the conventional approach 805.

Figure 9:
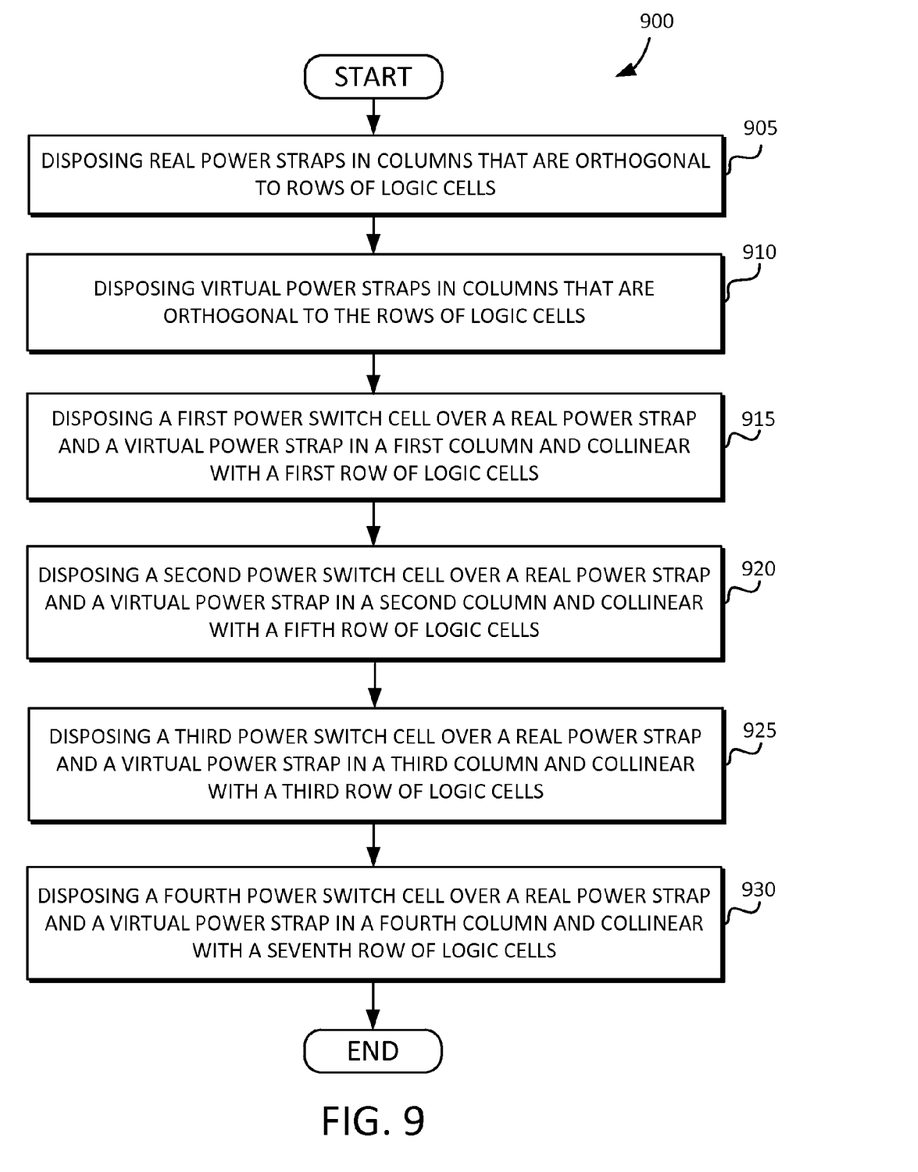
FIG. 9 is a flow diagram illustrating a technique for producing an MTCMOS circuit in accordance with embodiments of the inventive concept.

FIG. 9 is a flow diagram 900 illustrating a technique for producing an MTCMOS circuit in accordance with embodiments of the inventive concept. The technique begins at 905 where real power straps are disposed in columns that are orthogonal to rows of logic cells. At 910, virtual power straps are disposed in columns that are orthogonal to the rows of logic cells. At 915, a first power switch cell is disposed over a real power strap and a virtual power strap in a first column, and collinear with a first row of logic cells. At 920, a second power switch cell is disposed over a real power strap and a virtual power strap in a second column, and collinear with a fifth row of logic cells. At 925, a third power switch cell is disposed over a real power strap and a virtual power strap in a third column, and collinear with a third row of logic cells. At 930, a fourth power switch cell is disposed over a real power strap and a virtual power strap in a fourth column, and collinear with a seventh row of logic cells.

Figure 10:
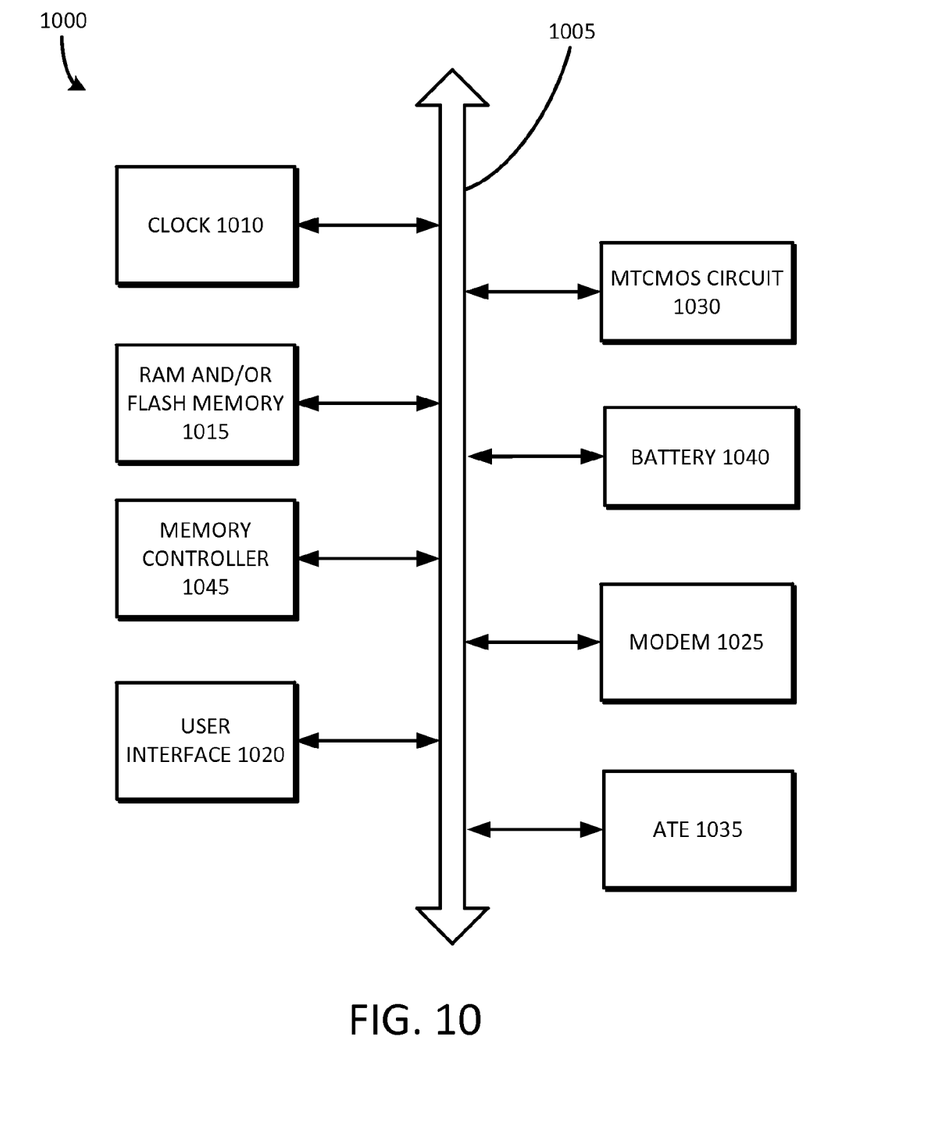
FIG. 10 is an example block diagram of a computing system including An MTCMOS circuit according to embodiments of the inventive concept as disclosed herein.

FIG. 10 is an example block diagram of a computing system 1000 including an MTCMOS circuit 1030 according to embodiments of the inventive concept as disclosed herein. The MTCMOS circuit 1030 may be electrically connected to a system bus 1005. The computing system 1000 may also include a clock 1010, a random access memory (RAM) and/or flash memory 1015, a memory controller 1045, a user interface 1020, a modem 1025 such as a baseband chipset, and/or automated test equipment (ATE) 1035, any or all of which may be electrically coupled to the system bus 1005.

If the computing system 1000 is a mobile device, it may further include a battery 1040, which powers the computing system 1000. Although not shown in FIG. 10, the computing system 1000 may further include an application chipset, a camera image processor (CIS), a mobile DRAM, and the like. The memory controller 1045 and the flash memory 1015 may constitute a solid state drive/disk (SSD), which uses a non-volatile memory to store data.

In example embodiments, the computing system 1000 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A semiconductor circuit, comprising:
a plurality of rows of logic cells;
a real power strap disposed over the plurality of rows of logic cells;
a virtual power strap disposed over the plurality of rows of logic cells and adjacent to the real power strap;
a first power switch cell disposed over a first portion of the real power strap and a first portion of the virtual power strap, and collinear with a first row from among the plurality of rows of logic cells;
a second power switch cell disposed over a second portion of the real power strap and a second portion of the virtual power strap, and collinear with another row from among the plurality of rows of logic cells; and
a plurality of tap cells disposed over portions of the real power strap and portions of the virtual power strap,
wherein two or more rows of logic cells from among the plurality of rows of logic cells are between the first row of logic cells and the another row of logic cells.

2. The semiconductor circuit of claim 1, wherein:
the real power strap is connected to a metal 5 layer,
the virtual power strap is connected to a metal 3 layer, and
the metal 3 layer is a relatively lower layer than the metal 5 layer.

3. The semiconductor circuit of claim 1, wherein the plurality of tap cells include always on tap cells.

4. A semiconductor circuit, comprising:
a plurality of rows of logic cells;
a real power strap disposed over the plurality of rows of logic cells;
a virtual power strap disposed over the plurality of rows of logic cells and adjacent to the real power strap;
a first power switch cell disposed over a first portion of the real power strap and a first portion of the virtual power strap, and collinear with a first row from among the plurality of rows of logic cells; and
a second power switch cell disposed over a second portion of the real power strap and a second portion of the virtual power strap, and collinear with another row from among the plurality of rows of logic cells,
wherein two or more rows of logic cells from among the plurality of rows of logic cells are between the first row of logic cells and the another row of logic cells,
wherein the another row is referred to as a ninth row of logic cells from among the plurality of rows of logic cells,
wherein the two or more rows include a second row, a third row, a fourth row, a fifth row, a sixth row, a seventh row, and an eighth row of logic cells between the first row of logic cells and the ninth row of logic cells, and
wherein none of the second row, the third row, the fourth row, the fifth row, the sixth row, the seventh row, and the eighth row include a power switch cell disposed over the real power strap and the virtual power strap.

5. The semiconductor circuit of claim 4, wherein the real power strap is referred to as a first real power strap, and the virtual power strap is referred to as a first virtual power strap, the semiconductor circuit further comprising:
a second real power strap disposed over the plurality of rows of logic cells;
a second virtual power strap disposed over the plurality of rows of logic cells and adjacent to the second real power strap; and
a third power switch cell disposed over a portion of the second real power strap and a portion of the second virtual power strap, and collinear with the fifth row from among the plurality of rows of logic cells.

6. The semiconductor circuit of claim 5, further comprising:
a third real power strap disposed over the plurality of rows of logic cells;
a third virtual power strap disposed over the plurality of rows of logic cells and adjacent to third the real power strap; and
a fourth power switch cell disposed over a portion of the third real power strap and a portion of the third virtual power strap, and collinear with the third row from among the plurality of rows of logic cells.

7. The semiconductor circuit of claim 5, further comprising:
a fourth real power strap disposed over the plurality of rows of logic cells;
a fourth virtual power strap disposed over the plurality of rows of logic cells and adjacent to fourth the real power strap; and
a fifth power switch cell disposed over a portion of the fourth real power strap and a portion of the fourth virtual power strap, and collinear with the seventh row from among the plurality of rows of logic cells.

8. The semiconductor circuit of claim 5, further comprising:
a fifth real power strap disposed over the plurality of rows of logic cells;
a fifth virtual power strap disposed over the plurality of rows of logic cells and adjacent to the fifth real power strap; and a sixth power switch cell disposed over a portion of the fifth real power strap and a portion of the fifth virtual power strap, and collinear with the first row from among the plurality of rows of logic cells.

9. The semiconductor circuit of claim 4, wherein the first row of logic cells is adjacent to the second row, the second row of logic cells is adjacent to the third row, the third row of logic cells is adjacent to the fourth row, the fourth row of logic cells is adjacent to the fifth row, the fifth row of logic cells is adjacent to the sixth row, the sixth row of logic cells is adjacent to the seventh row, the seventh row of logic cells is adjacent to the eighth row, and the eighth row of logic cells is adjacent to the ninth row.

10. The semiconductor circuit of claim 4, wherein the real power strap is referred to as a first real power strap, and the virtual power strap is referred to as a first virtual power strap, the semiconductor circuit further comprising:
   a second real power strap disposed over the plurality of rows of logic cells;
   a second virtual power strap disposed over the plurality of rows of logic cells and adjacent to second the real power strap;
   a third power switch cell disposed over a portion of the second real power strap and a portion of the second virtual power strap, and collinear with the fifth row from among the plurality of rows of logic cells;
   a third real power strap disposed over the plurality of rows of logic cells;
a third virtual power strap disposed over the plurality of rows of logic cells and adjacent to the third real power strap;
   a fourth power switch cell disposed over a portion of the third real power strap and a portion of the third virtual power strap, and collinear with the third row from among the plurality of rows of logic cells;
   a fourth real power strap disposed over the plurality of rows of logic cells;
   a fourth virtual power strap disposed over the plurality of rows of logic cells and adjacent to the fourth real power strap;
   a fifth power switch cell disposed over a portion of the fourth real power strap and a portion of the fourth virtual power strap, and collinear with the seventh row from among the plurality of rows of logic cells;
   a fifth real power strap disposed over the plurality of rows of logic cells;
a fifth virtual power strap disposed over the plurality of rows of logic cells and adjacent to the fifth real power strap; and
   a sixth power switch cell disposed over a portion of the fifth real power strap and a portion of the fifth virtual power strap, and collinear with the first row from among the plurality of rows of logic cells.

11. The semiconductor circuit of claim 10, wherein:
   the positioning of the first, third, fourth, and fifth power switch cells forms a power switch cell layout pattern, and
   the power switch cell layout pattern repeats for every eight rows of logic cells from among the plurality of rows of logic cells.

12. The semiconductor circuit of claim 11, further comprising:
   a first group of logic cells; and
   a second group of logic cells,
   wherein the first group of logic cells is adjacent to at least four power switch cells from among the power switch cell layout pattern, and wherein the second group of logic cells is adjacent to at least four different power switch cells from among the power switch cell layout pattern.

13. The semiconductor circuit of claim 12, wherein:
   the at least four power switch cells provide voltage sources to the first group of logic cells, and the at least four different power switch cells provide voltage sources to the second group of logic cells.

14. A semiconductor circuit, comprising:
   a plurality of rows of logic cells;
   a first power switch cell that is collinear with a first row from among the plurality of rows of logic cells, wherein the first power switch cell is associated with a first column;
   a second power switch cell that is collinear with another row from among the plurality of rows of logic cells, wherein the second power switch cell is associated with the first column;
   a third power switch cell that is collinear with the fifth row from among the plurality of rows of logic cells, wherein the third power switch cell is associated with a second column;
   a fourth power switch cell that is collinear with the third row from among the plurality of rows of logic cells, wherein the fourth power switch cell is associated with a third column;
   a fifth power switch cell that is collinear with the seventh row from among the plurality of rows of logic cells, wherein the fifth power switch cell is associated with a fourth column; and
   a sixth power switch cell that is collinear with the first row from among the plurality of rows of logic cells, wherein the sixth power switch cell is associated with a fifth column,
   wherein two or more rows of logic cells from among the plurality of rows of logic cells, without power switch cells in the first column, are between the first row of logic cells and the another row of logic cells,
   wherein the another row is referred to as a ninth row of logic cells from among the plurality of rows of logic cells, and
   wherein the two or more rows include a second row, a third row, a fourth row, a fifth row, a sixth row, a seventh row, and an eighth row of logic cells between the first row of logic cells and the ninth row of logic cells.

15. The semiconductor circuit of claim 14, wherein the first row of logic cells is adjacent to the second row, the second row of logic cells is adjacent to the third row, the third row of logic cells is adjacent to the fourth row, the fourth row of logic cells is adjacent to the fifth row, the fifth row of logic cells is adjacent to the sixth row, the sixth row of logic cells is adjacent to the seventh row, the seventh row of logic cells is adjacent to the eighth row, and the eighth row of logic cells is adjacent to the ninth row.

16. A method for producing an MTCMOS circuit, the method comprising:
   disposing real power straps in columns over rows of logic cells;
   disposing virtual power straps in the columns over the rows of logic cells;
   disposing a first power switch cell over a first real power strap from among the real power straps and a first virtual power strap from among the virtual power straps in a first column from among the columns, and collinear with a first row of logic cells from among the rows of logic cells;

disposing a second power switch cell over a second real power strap from among the real power straps and a second virtual power strap from among the virtual power straps in a second column from among the columns, and collinear with a fifth row of logic cells from among the rows of logic cells;

disposing a third power switch cell over a third real power strap from among the real power straps and a third virtual power strap from among the virtual power straps in a third column from among the columns, and collinear with a third row of logic cells from among the rows of logic cells; and disposing a fourth power switch cell over a fourth real power strap from among the real power straps and a fourth virtual power strap from among the virtual power straps in a fourth column from among the columns, and collinear with a seventh row of logic cells from among the rows of logic cells.

* * * * *